US012697650B2

(12) United States Patent
Breen et al.

(10) Patent No.: US 12,697,650 B2
(45) Date of Patent: Aug. 4, 2026

(54) WIPER CAP ASSEMBLY

(71) Applicant: STANDARD LIFTERS, INC., Grand Rapids, MI (US)

(72) Inventors: Scott M. Breen, Ada, MI (US); Joel T. Pyper, Holland, MI (US)

(73) Assignee: STANDARD LIFTERS, INC., Grand Rapids, MI (US)

( * ) Notice: Subject to any disclaimer, the term of this patent is extended or adjusted under 35 U.S.C. 154(b) by 973 days.

(21) Appl. No.: 17/960,940

(22) Filed: Oct. 6, 2022

(65) Prior Publication Data

US 2024/0116095 A1 Apr. 11, 2024

Related U.S. Application Data

(60) Provisional application No. 63/253,570, filed on Oct. 8, 2021.

(51) Int. Cl.
B21D 7/02 (2006.01)
F16B 4/00 (2006.01)
(52) U.S. Cl.
CPC ................ B21D 7/02 (2013.01); F16B 4/004 (2013.01)
(58) Field of Classification Search
None
See application file for complete search history.

(56) References Cited

U.S. PATENT DOCUMENTS

| | | | |
|---|---|---|---|
| 2,346,297 A | 4/1944 | Garbe | |
| 2,487,233 A | 11/1949 | Gerke | |
| 2,627,313 A | 2/1953 | Marsilius | |
| 2,629,615 A | 2/1953 | Marsilius | |
| 2,663,180 A | 12/1953 | Benedict | |
| 2,979,004 A | 4/1961 | Kenville et al. | |
| 3,386,781 A | 6/1968 | Blazek et al. | |
| 3,474,656 A | 10/1969 | Kraft | |
| 3,514,166 A | 5/1970 | Coley | |
| 3,568,555 A | 3/1971 | Stroh | |
| 3,664,258 A | 5/1972 | Vecchi | |
| 3,730,039 A | 5/1973 | Fedrigo | |
| 3,871,665 A * | 3/1975 | Burke ................... | F16J 15/3212 277/560 |
| 3,897,118 A | 7/1975 | Wolfthal | |

(Continued)

FOREIGN PATENT DOCUMENTS

| | | | | |
|---|---|---|---|---|
| CA | 2456395 A1 * | 2/2005 | | |
| DE | 102011117820 A1 * | 5/2013 | .......... | F16J 15/3236 |

(Continued)

OTHER PUBLICATIONS

Tapered_snap_ring_groove_Clm_1_10_.pdf (https://docplayer.net/48771795-Rotor -clip-retaining-rings-made-to-world-standards-inch-din-metric-ansi-metric-jis-japanese-industrial-standard.html) (website accessed Sep. 24, 2021) (Year: 2017).

(Continued)

*Primary Examiner* — Jonathan P Masinick
(74) *Attorney, Agent, or Firm* — PRICE HENEVELD LLP

(57) ABSTRACT

A wiper cap assembly that can couple to a reciprocating member of a metal forming die. The wiper cap assembly couples to the top of a guide housing and includes a rod wiper that presses against a reciprocating rod within the guide housing. The rod wiper prevents the entry of containments on the section of the rod that reciprocates past the rod wiper.

11 Claims, 6 Drawing Sheets

(56) References Cited

U.S. PATENT DOCUMENTS

| | | | |
|---|---|---|---|
| 4,003,283 | A | 1/1977 | Janiszewski |
| 4,060,023 | A * | 11/1977 | Vegella ............... F16J 15/3236 |
| | | | 277/346 |
| 4,080,819 | A | 3/1978 | Hook et al. |
| 4,135,770 | A | 1/1979 | Doherty et al. |
| 4,199,313 | A | 4/1980 | Bohnenberger |
| 4,282,736 | A | 8/1981 | Mashburn |
| 4,326,402 | A | 4/1982 | Wallis |
| 4,483,173 | A | 11/1984 | Duhamel |
| 4,696,180 | A | 9/1987 | Zandel |
| 4,732,033 | A | 3/1988 | Smedberg et al. |
| 4,742,746 | A | 5/1988 | Olsson |
| 4,765,227 | A | 8/1988 | Balazs et al. |
| 4,796,460 | A | 1/1989 | Smedberg et al. |
| 4,836,071 | A | 6/1989 | Ersoy |
| 4,838,527 | A * | 6/1989 | Holley .................. F16F 9/3264 |
| | | | 267/119 |
| 5,113,736 | A | 5/1992 | Meyerle |
| 5,243,743 | A | 9/1993 | Peterson |
| 5,245,904 | A | 9/1993 | Mayerle |
| 5,275,387 | A * | 1/1994 | Cotter .................. F16J 15/3252 |
| | | | 277/575 |
| 5,722,280 | A | 3/1998 | Bodnar |
| 5,775,212 | A | 7/1998 | Takao |
| 5,788,903 | A | 8/1998 | Allgaier |
| 5,974,852 | A | 11/1999 | Nieschulz |
| 6,003,848 | A * | 12/1999 | Cotter .................. F16F 9/3242 |
| | | | 267/64.11 |
| 6,116,613 | A * | 9/2000 | Friend .................. F16J 15/3252 |
| | | | 277/560 |
| 6,408,728 | B1 | 6/2002 | Tsuji et al. |
| 6,848,290 | B2 | 2/2005 | Pyper et al. |
| 6,895,797 | B2 | 5/2005 | Lowry et al. |
| 6,896,110 | B2 * | 5/2005 | Vanmechelen .......... F16J 15/56 |
| | | | 277/384 |
| 6,925,922 | B2 | 8/2005 | Manabe et al. |
| 6,986,273 | B2 | 1/2006 | Rager |
| 7,000,446 | B2 | 2/2006 | Nieschulz et al. |
| 7,004,007 | B2 | 2/2006 | Kruger et al. |
| 7,114,365 | B2 | 10/2006 | Rooney, Jr. et al. |
| 7,152,451 | B1 | 12/2006 | Cotter |
| 7,559,542 | B2 * | 7/2009 | Cotter ..................... F16F 9/585 |
| | | | 267/64.19 |
| 7,730,757 | B2 | 6/2010 | Pyper et al. |
| 7,770,430 | B2 | 8/2010 | Micell et al. |
| 7,861,569 | B2 | 1/2011 | Cotter et al. |
| 7,950,262 | B2 | 5/2011 | Pyper et al. |
| 8,074,486 | B1 | 12/2011 | Pyper et al. |
| 8,151,619 | B2 | 4/2012 | Pyper et al. |
| 8,444,122 | B2 * | 5/2013 | Cotter .................. F16F 9/0227 |
| | | | 267/64.13 |
| 8,522,595 | B2 | 9/2013 | Pyper et al. |
| 8,567,227 | B2 | 10/2013 | Cotter |
| 8,910,502 | B2 | 12/2014 | Breen et al. |
| 8,919,178 | B2 | 12/2014 | Breen et al. |
| 8,939,005 | B2 * | 1/2015 | Breen ...................... B21K 1/76 |
| | | | 72/456 |
| 9,221,092 | B2 | 12/2015 | Pyper et al. |
| 9,248,491 | B2 | 2/2016 | Breen et al. |
| 9,254,515 | B2 | 2/2016 | Breen et al. |
| 9,272,321 | B2 | 3/2016 | Breen et al. |
| 9,302,311 | B2 * | 4/2016 | Pyper .................... B21D 53/30 |
| 9,447,834 | B2 * | 9/2016 | Cotter .................. F16F 9/0281 |
| 10,035,180 | B2 | 7/2018 | Breen et al. |
| 10,046,376 | B2 | 8/2018 | Breen et al. |
| 10,099,270 | B2 | 10/2018 | Pyper et al. |
| 10,265,757 | B2 | 4/2019 | Pyper et al. |
| 10,337,617 | B2 * | 7/2019 | Desjardins ........... F16J 15/3268 |
| 10,343,205 | B2 | 7/2019 | Breen et al. |
| 10,343,206 | B2 | 7/2019 | Breen et al. |
| 10,527,121 | B2 * | 1/2020 | Cotter .................. F16F 9/0281 |
| 10,954,984 | B2 | 3/2021 | Breen et al. |
| 11,344,943 | B2 * | 5/2022 | Breen .................... B21D 37/12 |
| 12,402,396 | B2 * | 8/2025 | Breen .................... B21D 37/10 |
| 2002/0124706 | A1 | 9/2002 | Mochizuki |
| 2004/0119241 | A1 * | 6/2004 | Castleman .......... F16J 15/3232 |
| | | | 277/436 |
| 2005/0045786 | A1 | 3/2005 | Tupper et al. |
| 2005/0095062 | A1 | 5/2005 | Iverson et al. |
| 2007/0037434 | A1 | 2/2007 | Fedder et al. |
| 2008/0295315 | A1 | 12/2008 | Horng |
| 2009/0193865 | A1 | 8/2009 | Pyper et al. |
| 2009/0308242 | A1 | 12/2009 | Choi et al. |
| 2011/0302988 | A1 | 12/2011 | Breen et al. |
| 2012/0055224 | A1 | 3/2012 | Breen et al. |
| 2012/0210766 | A1 | 8/2012 | Breen et al. |
| 2015/0076753 | A1 * | 3/2015 | Cotter .................... F16F 9/435 |
| | | | 267/124 |
| 2016/0082499 | A1 | 3/2016 | Pyper et al. |
| 2019/0210086 | A1 | 7/2019 | Pyper et al. |
| 2021/0069769 | A1 | 3/2021 | Breen et al. |

FOREIGN PATENT DOCUMENTS

| | | | | |
|---|---|---|---|---|
| EP | | 0050949 A1 * | 5/1982 | ............... F16J 15/56 |
| EP | | 1074759 A2 * | 2/2001 | ............ F16F 9/0218 |

OTHER PUBLICATIONS

Split_bronze_bushing_Clm_4_6.pdf (https://web.archive.org/web/20150522015649/https://www.nationalbronze.com/News/split-bronze-bearings-variations-and-applications/) (website accessed Sep. 24, 2021) (Year: 2015).

Plug_Graphite_Bearings_Clm_5_.pdf (https://web.archive.org/web/20130228154123/http://www.nationalbronze.com/plug-graphite-bearings.php) (website accessed Sep. 24, 2021) (Year: 2013).

* cited by examiner

WIPER CAP ASSEMBLY

CROSS REFERENCE TO RELATED APPLICATION

Applicant hereby claims the priority benefits under the provisions of 35 U.S.C. § 119, basing said claim of priority on related U.S. Provisional Application No. 63/253,570 filed Oct. 8, 2021, which is incorporated in its entirety herein by reference.

FIELD OF THE INVENTION

The present invention relates to metal forming dies and the like and particularly to a wiper cap assembly for a die member component and associated methods.

BACKGROUND OF THE INVENTION

Metal forming dies, such as stamping dies and the like are well known in the art. Progressive metal forming dies are unique, very sophisticated mechanisms which have multiple stations or progressions that are aligned longitudinally, and are designed to perform a specified operation at each station in a predetermined sequence to create a finished metal part. Progressive stamping dies are capable of forming complex metal parts at very high speeds, so as to minimize manufacturing costs.

Heretofore, the dies used in metal forming presses have typically been individually designed, one of a kind assemblies for a particular part, with each of the various components being handcrafted and custom mounted or fitted in an associated die set, which is in turn positioned in a stamping press. Not only are the punches and other forming tools in the die set individually designed and constructed, but the other parts of the die set, such as stock lifters, guides, end caps and keepers, cam returns, etc., are also custom designed and individually installed in the die set. Current die making processes require careful machining, precision holes and recesses in the die set for mounting the individual components, such that the same are quite labor intensive, and require substantial lead time to make, test, and set up in a stamping press. Consequently, such metal forming dies are very expensive to design, manufacture, and repair or modify.

In addition, contaminants, including external fluids and debris, can enter into reciprocating members of such metal forming dies, including stock lifters, guides, keepers, etc. Such contaminants can damage and/or limit the effectiveness of such reciprocating members. A wiper member that can limit or prevent the entry of such contaminants into a reciprocating member would be advantageous.

SUMMARY OF THE INVENTION

One object of the present invention is a guide assembly for a metal forming die having converging and diverging plates. The guide assembly has a guide pin body with a guide pin aperture and a wiper cap groove. The guide assembly also includes a wiper cap body with a first end portion, a second end portion, a medial portion between the first end portion and the second end portion, and an aperture. The first end portion of the wiper cap body has a flange section with a first diameter at the intersection with the medial portion and the medial portion has a second diameter that is larger than the first diameter forming an exterior shoulder on the wiper cap body. The second end portion includes an inwardly extending ledge that forms a wiper groove between the ledge and the medial portion. The guide assembly includes a rod wiper with a first end section and a second end section. The first end section is shaped to be received in the wiper groove on the wiper cap body. The second end section is a tapered section extending from the first end section. The tapered section includes an inwardly extending portion with an internal diameter and an exterior tapered surface. A guide pin is received in the guide pin aperture of the guide pin body. The guide pin has an external diameter that is larger than the internal diameter of the inwardly extending portion. The flange section of the wiper cap body is received in the wiper cap groove of the guide pin body.

Another aspect of the invention is a wiper cap assembly for a guide pin body used in a metal forming die. The guide pin body has a guide pin aperture with a wiper cap groove. The wiper cap body has a first end portion, a second end portion, a medial portion between the first end portion and the second end portion, and an aperture. The first end portion has a flange section with a first diameter at the intersection with the medial portion. The medial portion has a second diameter that is larger than the first diameter forming an exterior shoulder on the wiper cap body. The second end portion includes an inwardly extending ledge that forms a wiper groove between the ledge and the medial portion. A rod wiper with a first end section and a second end section, the first end section is shaped to be received in the wiper groove on the wiper cap body. The second end section is a tapered section extending from the first end section. The tapered section includes an inwardly extending portion with an internal diameter and an exterior tapered surface. A guide pin is received in the guide pin aperture of the guide pin body, the guide pin has an external diameter that is larger than the internal diameter of the inwardly extending portion. The flange section of the wiper cap body is received in the wiper cap groove of the guide pin body.

Yet another aspect of the invention is a guide pin assembly. The guide pin body of the guide pin assembly has a guide pin aperture with a wiper cap groove. The guide pin assembly includes a wiper cap body with a first end portion, a second end portion, a medial portion between the first end portion and the second end portion, and an aperture. The first end portion has a flange section with a first diameter at the intersection with the medial portion. The medial portion has a second diameter that is larger than the first diameter forming an exterior shoulder on the wiper cap body. The second end portion includes an inwardly extending ledge that forms a wiper groove between the ledge and the medial portion. The guide pin assembly includes a rod wiper with a first end section and a second end section, the first end section is shaped to be received in the wiper groove on the wiper cap body. The second end section is a tapered section extending from the first end section. The tapered section includes an inwardly extending portion with an internal diameter and an exterior tapered surface. A guide pin is received in the guide pin aperture of the guide pin body, the guide pin having an external diameter that is larger than the internal diameter of the inwardly extending portion. The flange section of the wiper cap body is received in the wiper cap groove of the guide pin body.

These and other advantages of the invention will be further understood and appreciated by those skilled in the art by reference to the following written specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in the attached drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
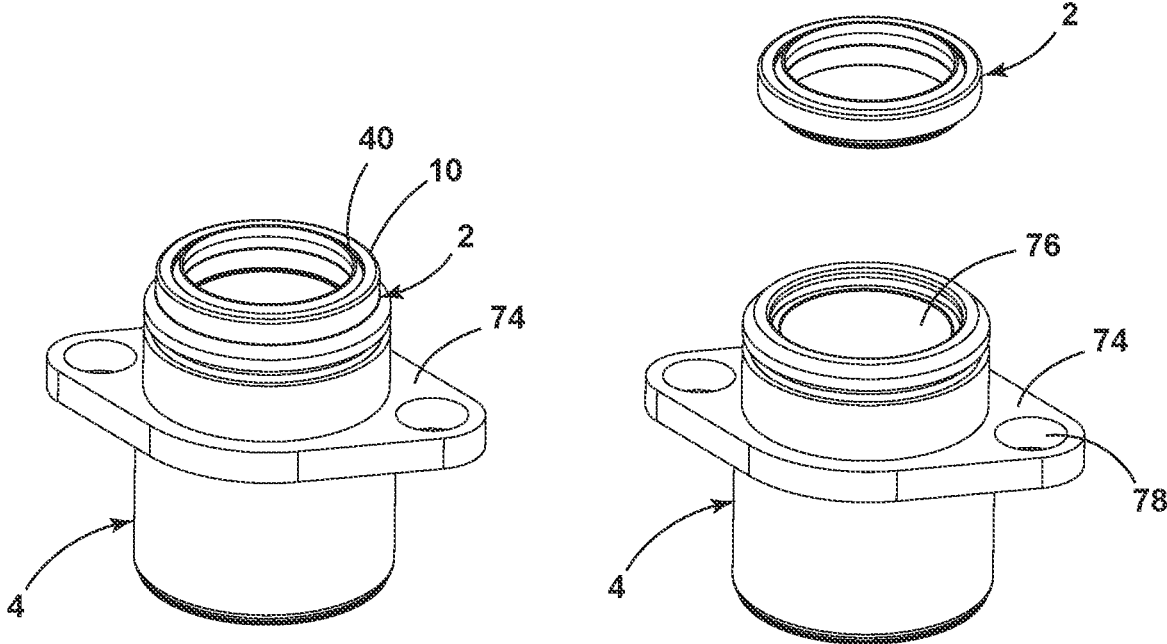
FIG. 1 is a front perspective view of a guide pin assembly with a wiper cap installed on the left and the wiper cap disengaged from the guide pin housing on the right.
Figure 2:
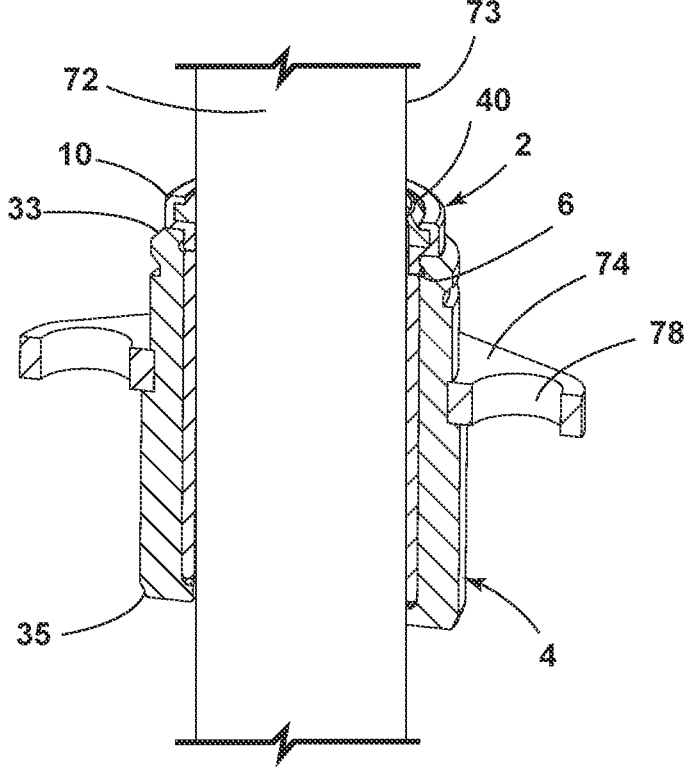
FIG. 2 is a partial cross-sectional view of a guide pin in the guide pin housing with the wiper cap installed.
Figure 3:
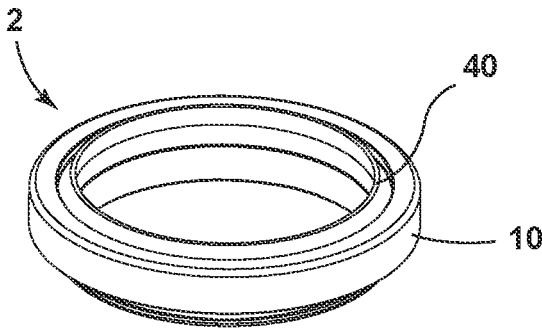
FIG. 3 is a front perspective view of the guide pin wiper installed in the wiper cap housing in the upper figure, and the components separate in the lower figure.
Figure 3:
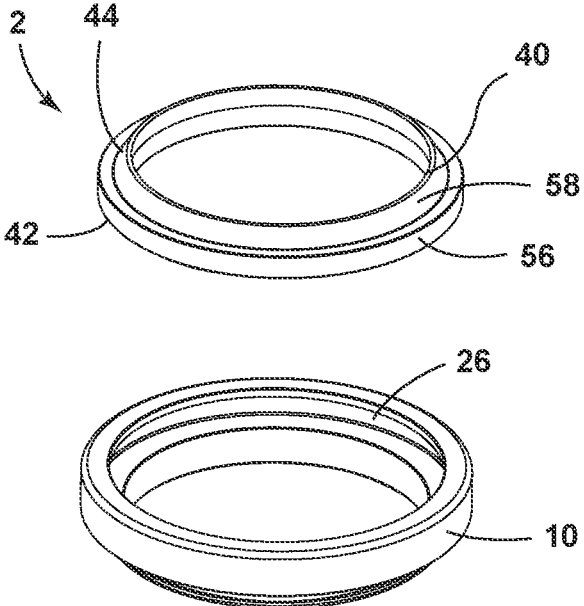
Figure 4:
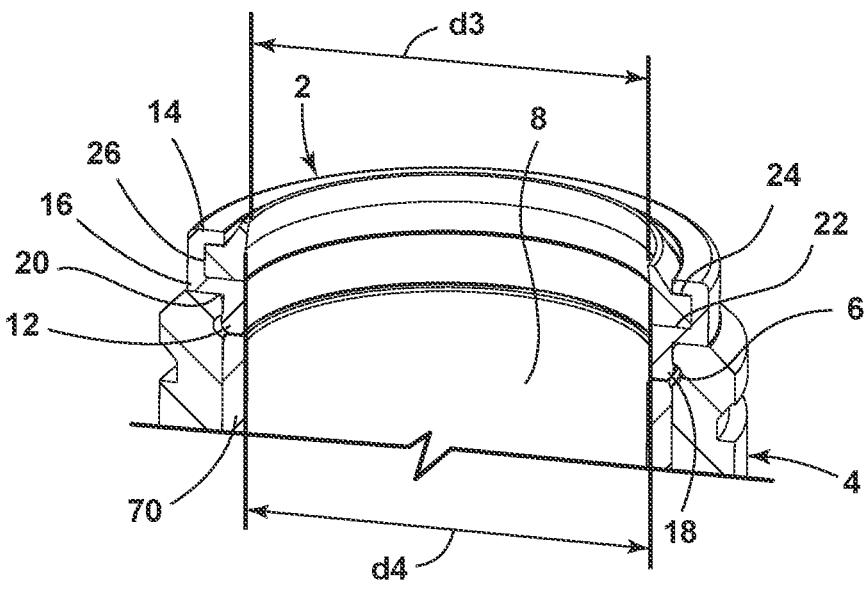
FIG. 4 is a partial cross-sectional view of the wiper cap assembly installed on a guide pin body utilizing various width bushings.
Figure 4:
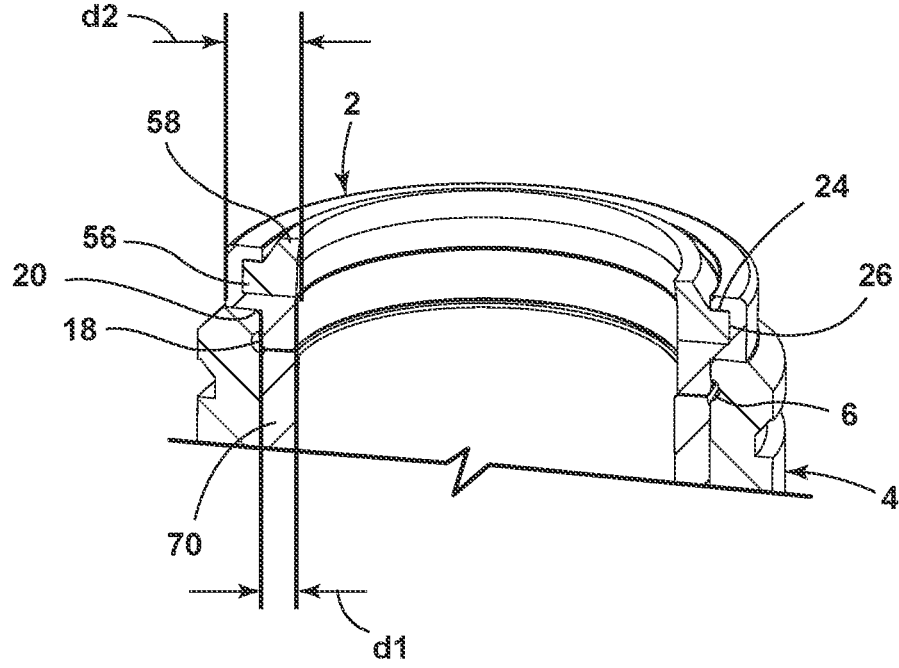

The reference numeral 2 generally designates a wiper cap assembly. In the illustrated embodiments, the wiper cap assembly 2 is installed on a guide body 4 that has a first end section 35 and a second end section 33. The guide body 4 includes a guide pin aperture 8 that receives a reciprocating guide pin 72 as illustrated in FIG. 2. The guide body 4 can include a flange 74 with apertures 76 to permit the installation of the guide body 4 to a die member in a reciprocating metal forming die. The guide pin aperture 8 has a wiper cap groove 6. The guide pin aperture 8 can be sized to receive a variety of types and sizes of bushings 70 as illustrated in FIG. 4. The bushings 70 can receive the guide pin 72.

The wiper cap assembly 2 includes a wiper cap housing 10 with a first end portion 12, a second end portion 14, and a medial portion 16 between the first end portion 12 and the second end portion 14 as shown in FIG. 4. The first end portion 12 has a first diameter d1 at the intersection of the first end portion 12 and the medial portion 16. The medial portion 16 has a second diameter d2 that is larger than the first diameter d1 that forms an external shoulder 20 on the wiper cap housing 10. The second end portion 14 has an inwardly extending ledge 24 that forms a wiper groove 26 between the inwardly extending ledge 24 and the medial portion 16. The first end portion 12 has an exterior flange 18. In the illustrated embodiment, the exterior flange 18 is a continuous rounded lobe located at the terminal end of the first end portion 12. However, the exterior flange 18 could have a different profile, could be interrupted, and/or could be located away from the terminal end of the first end portion 12. The terminal end surface of the first end portion 12 of the wiper cap housing can contact the top surface of the bushing 70 or can be spaced apart from the bushing 70.

Figure 5:
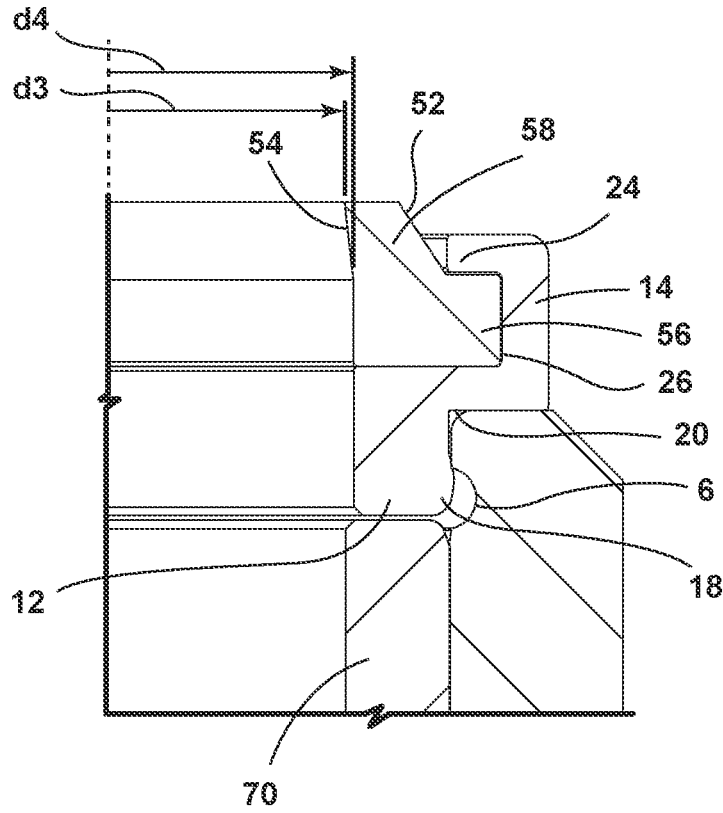
FIG. 5 is a partial cross-sectional view of the wiper cap assembly attached to the guide pin housing.

The rod wiper 40 includes a first end portion 42 and a second end portion 44. The first end portion 42 is illustrated as having a main body section 56 that is a generally cylindrical ring. The second end portion 44 is illustrated as a tapered section 58 that extends from the main body 56. The tapered section 58 includes a tapered external surface 52 and a tapered internal surface 54. The minimum internal diameter d3 of the tapered internal surface 54 is smaller than the maximum internal diameter d4 of the tapered internal surface 54 as shown in FIGS. 4 and 5. The main body 56 of the rod wiper 40 is received in the wiper groove 26 on the wiper cap housing 10. The rod wiper 40 is made from a flexible material, such as rubber, so it can be easily compressed, while still being able to expand back to form.

The guide pin 72 has a diameter that is larger than the minimum internal diameter d3 of the tapered internal surface 54 of the rod wiper 40. Thus, the internal surface 54 of the tapered section 58 engages the external surface of the guide pin 72 reducing and/or preventing contaminants such as external fluids and debris from the entering into the second end section 33 of the guide body 4. Specifically, the rod wiper 40 prevents the entry of contaminants on the section 73 of the guide pin 72 that is above the rod wiper 40 as the rod wiper 40 will wipe away any contaminants on the external surface of that section 73 of the guide pin 72 as it reciprocates past the rod wiper 40. The exterior tapered surface 52 of the rod wiper 40 will cause the contaminants to fall away from the guide pin 72.

The second end portion 44 of the rod wiper 40 can have an alternative shape than what has been illustrated. For example, the second end portion 44 can have internal ribs. The second end portion 44 could have different-shaped internal and external surfaces. In addition, the main body section 56 can also have an alternative shape. Similarly, the profile of the wiper groove 26 can be altered. Ultimately, any shaped rod wiper 40 that will compress against the exterior surface of the guide pin 72 may be used with a correspondingly shaped wiper groove 26. The wiper cap housing 10 can be installed on a guide body 4 that is already coupled to a die member or can be installed to a guide body 4 before it is coupled to a die member. The wiper cap housing 10 is coupled by the snap-fit of the exterior flange 18 into the wiper cap groove 6 on the guide body 4. The interference fit between the exterior flange 18 and the wiper cap groove 6 permits the wiper cap housing 10 to be securely retained on the guide body 4. The rod wiper 40 may be replaced by removal of the rod wiper 40 from the wiper cap housing 10. A replacement rod wiper 40 can be flexed into the wiper groove 26 of the wiper cap housing 10.

Figure 6:
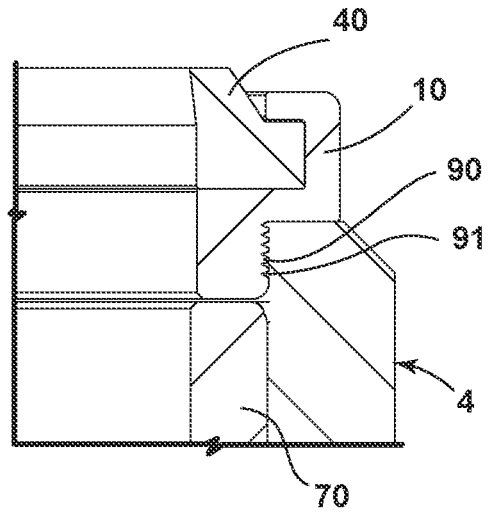
FIG. 6 includes partial cross-sectional views illustrating different coupling mechanisms between the wiper cap housing and the guide pin housing.
Figure 6:
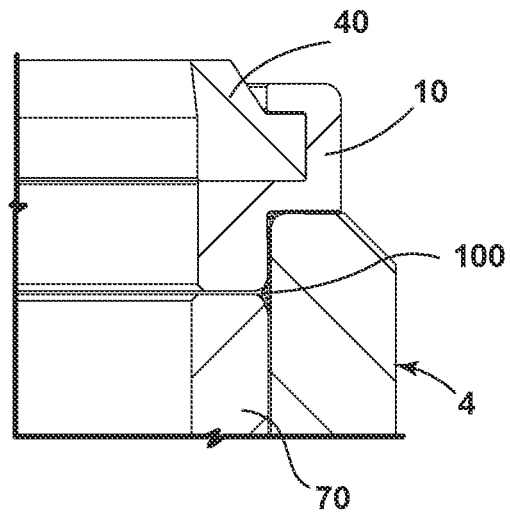
Figure 6:
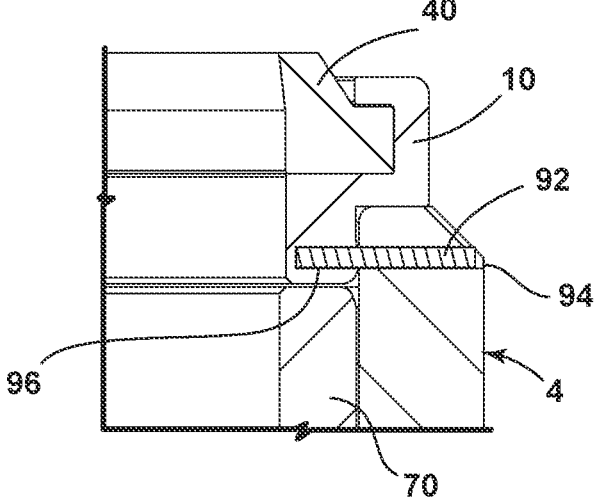

Additional features can be used to couple the wiper cap housing 10 to the guide body 4 as illustrated in FIG. 6. For example, as illustrated in the top figure, the exterior surface of the first end portion 12 of the wiper cap housing 10 can be a threaded engagement with the guide body 4. The wiper cap housing 10 can also be adhered to the guide body 4 by adhesive 100 as shown in the middle figure. The wiper cap housing 10 could also be coupled by a fastener 92 that is received in aligned openings 94 in the guide body 4 and opening 96 in the wiper cap housing 10. The fastener 92 could be threaded and one or more of openings 94, 96 could be threaded. The fastener 92 could also be a dowel pin or split spring roll dowel pin.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention is claimed as follows:

1. A guide assembly for a metal forming die having converging and diverging plates, comprising:

a guide pin body having a guide pin aperture with a wiper cap groove;

a wiper cap body having a first end portion, a second end portion, a medial portion between said first end portion and said second end portion, and an aperture;

wherein said first end portion has a flange section and a first diameter at the intersection with the medial portion;

wherein said medial portion has a second diameter that is larger than said first diameter forming an exterior shoulder on said wiper cap body; and wherein said second end portion includes an inwardly extending ledge that forms a wiper groove between said ledge and said medial portion;

a rod wiper with a first end section and a second end section, said first end section being shaped to be received in said wiper groove on said wiper cap body;

wherein said second end section is a tapered section extending from said first end section;

wherein said tapered section includes an inwardly extending portion with an internal diameter and an exterior tapered surface;

a guide pin received in the guide pin aperture of said guide pin body, said guide pin having an external diameter that is larger than the internal diameter of said inwardly extending portion; and wherein said flange section of said wiper cap body is received in said wiper cap groove of said guide pin body.

2. The guide assembly for a metal forming die of claim 1, including a bushing that is received within said guide pin body.

3. The guide assembly for a metal forming die of claim 2, wherein an internal diameter of said bushing is smaller than an internal diameter of said aperture in said wiper cap body at said first end portion.

4. The guide assembly for a metal forming die of claim 3, wherein said first end portion of said wiper cap body contacts said bushing.

5. A wiper cap assembly for a guide pin body used in a metal forming die, comprising:

a guide pin body having a guide pin aperture with a wiper cap groove;

a wiper cap body having a first end portion, a second end portion, a medial portion between said first end portion and said second end portion, and an aperture;

wherein said first end portion has a flange section and a first diameter at the intersection with the medial portion;

wherein said medial portion has a second diameter that is larger than said first diameter forming an exterior shoulder on said wiper cap body; and wherein said second end portion includes an inwardly extending ledge that forms a wiper groove between said ledge and said medial portion;

a rod wiper with a first end section and a second end section, said first end section being shaped to be received in said wiper groove on said wiper cap body;

wherein said second end section is a tapered section extending from said first end section;

wherein said tapered section includes an inwardly extending portion with an exterior tapered surface; and wherein said flange section of said wiper cap body is received in said wiper cap groove of said guide pin body.

6. The wiper cap assembly for a metal forming die of claim 5, including a bushing that is received within said guide pin body.

7. The wiper cap assembly for a metal forming die of claim 6, wherein an internal diameter of said bushing is smaller than an internal diameter of said aperture in said wiper cap body at said first end portion.

8. The wiper cap assembly for a metal forming die of claim 7, wherein said first end portion of said wiper cap body contacts said bushing.

9. A guide pin assembly comprising:

a guide pin body having a guide pin aperture with a wiper cap groove;

a wiper cap body having a first end portion, a second end portion, a medial portion between said first end portion and said second end portion, and an aperture;

wherein said first end portion has a flange section and a first diameter at the intersection with the medial portion;

wherein said medial portion has a second diameter that is larger than said first diameter forming an exterior shoulder on said wiper cap body; and wherein said second end portion includes an inwardly extending ledge that forms a wiper groove between said ledge and said medial portion;

a rod wiper with a first end section and a second end section, said first end section being shaped to be received in said wiper groove on said wiper cap body;

wherein said second end section is a tapered section extending from said first end section;

wherein said tapered section includes an inwardly extending portion with an internal diameter and an exterior tapered surface;

a guide pin received in the guide pin aperture of said guide pin body, said guide pin having an external diameter that is larger than the internal diameter of said inwardly extending portion; and wherein said flange section of said wiper cap body is received in said wiper cap groove of said guide pin body.

10. The guide assembly for a metal forming die of claim 9, including a bushing that is received within said guide pin body.

11. The guide assembly for a metal forming die of claim 10, wherein an internal diameter of said bushing is smaller than an internal diameter of said aperture in said wiper cap body at said first end portion.

* * * * *